United States Patent [19]

Imamura

[11] Patent Number: 4,668,081

[45] Date of Patent: May 26, 1987

[54] EXPOSURE DEVICE SUITABLE FOR USE IN COPYING MACHINE

[75] Inventor: Kenji Imamura, Himeji, Japan

[73] Assignee: Ushio Denki Kabushiki Kaisha, Tokyo, Japan

[21] Appl. No.: 852,205

[22] Filed: Apr. 15, 1986

[30] Foreign Application Priority Data

Apr. 26, 1985 [JP] Japan ............................ 60-61794[U]

[51] Int. Cl.⁴ .............................................. G03B 27/54
[52] U.S. Cl. .......................................... 355/70; 355/8; 362/11; 362/346
[58] Field of Search ..................... 355/70, 71, 67, 3 R, 355/11, 8; 362/3, 11, 297, 298, 303, 346

[56] References Cited

U.S. PATENT DOCUMENTS

| | | | |
|---|---|---|---|
| 3,368,071 | 2/1968 | Bentzman | 355/67 X |
| 3,784,304 | 1/1974 | Babin et al. | 355/67 |
| 3,947,115 | 3/1976 | Hamaguchi | 355/67 X |
| 3,982,116 | 9/1976 | Sakuma | 355/67 X |
| 4,143,964 | 3/1979 | Ogura et al. | 355/67 X |
| 4,239,383 | 12/1980 | Peterson | 355/67 |
| 4,295,186 | 10/1981 | Sugiura et al. | 355/67 X |
| 4,333,130 | 6/1982 | Mochizuki et al. | 355/71 X |
| 4,518,249 | 5/1985 | Murata et al. | 355/67 |
| 4,525,059 | 6/1985 | Haramaki | 355/67 X |
| 4,557,592 | 12/1985 | Yokoyama et al. | 355/11 X |
| 4,627,704 | 12/1986 | Hamasaki et al. | 355/71 X |

*Primary Examiner*—R. L. Moses
*Attorney, Agent, or Firm*—Robert F. Ziems

[57] ABSTRACT

An exposure device suitable for use in a copying machine includes a gutter-like mirror composed of an upper mirror and a lower mirror so that light projected from a light source onto the lower mirror is reflected to illuminate the surface of an original document in the pattern of a strip but light projected from the light source onto the upper mirror is reflected first onto the lower mirror and then reflected again by the lower mirror to illuminate the surface of the original document in the pattern of the strip. At least four small bulbs are arranged as the light source along the length of the gutter-like mirror and the envelopes of the small bulbs are frosted only at portions through which the internal filaments of the small bulbs face on the lower mirror.

4 Claims, 4 Drawing Figures

LENGTH OF
ILLUMINATED SECTION

EXPOSURE DEVICE SUITABLE FOR USE IN COPYING MACHINE

BACKGROUND OF THE INVENTION:

1. Field of the Invention:

This invention relates to an exposure system suitable for use in a copying machine to illuminate, in the pattern of a strip, the surface of an original document.

2. Description of the Prior Art:

In a conventional exposure device employed in an electronic copying machine to illuminate each original document, and illumination unit composed of a gutter-like mirror and an elongated light-source lamp extending along the length of the mirror is provided, whereby a narrow, elongated, strip-like section, which extends along the width of an associated table adapted to support each original document thereon, is illuminated by light reflected by the mirror and light radiated directly onto the strip-like section from the lamp. The thus-illuminated strip-like section is then caused to move along the length of the table so that an image of the whole area of the original document placed on the table is projected on a photosensitive member by way of an optical projection system.

In order to obtain a duplicate picture of mark of uniform density and good quality, it is essential to make the illuminance distribution uniform on the photosensitive member. For this purpose, it is necessary to employ a lamp as a light source in which dimensions of the light-emitting parts of the filament and the lengths of the light non-emitting sections between the adjacent light-emitting parts are suitably designed. Furthermore, certain additional means is also provided in an attempt to obtain a uniform illuminance distribution pattern. For example, a light-controlling blade is provided along an edge portion of the mirror in such a way that the blade can be pulled out from the edge portion. By adjusting the pulled-out length of the blade, the light is partly shielded to control the quantity of light which is allowed to reach the section to be illuminated. Alternatively, the reflection characteristics of the mirror are changed by suitable means. Even if a uniform illuminance distribution pattern is obtained by such means, this distribution pattern still contains small irregularity in light quantity, which is generally called "ripple". This ripple is attributed to the winding irregularity and deformation of the filament of each light-source lamp. In order to solve this ripple, it is effective to broaden the light to be irradiated onto the section. For this purpose, it may be contemplated to use a lamp equipped with a frosted glass envelope as a light-source lamp or impart light-diffusing function to the mirror. These approaches are however accompanied by such problems that the use of a lamp equipped with a glass envelope, which is frosted at its entire surface, leads to a lowered light-condensing efficiency and the light cannot be broaden to any sufficient extent if the diffusion function of the mirror is solely relied upon.

SUMMARY OF THE INVENTION

With the foregoing in view, the present invention has as its object the provision of an exposure device which is suitable for use in a copying machine, can solve ripple with a simple structure without reducing the efficiency of light utilization to any significant degree, and can achieve desired light distribution characteristics so as to form duplicated images of uniform quality.

In one aspect of this invention, there is thus provided an exposure device suitable for use in a copying machine, said exposure system including a gutter-like mirror composed of an upper mirror and a lower mirror so that light projected from a light source onto the lower mirror is reflected to illuminate the surface of an original document in the pattern of a strip but light projected from the light source onto the upper mirror is reflected first onto the lower mirror and then reflected again by the lower mirror to illuminate the surface of the original document in the pattern of the strip, wherein at least four small bulbs are arranged as the light source along the length of the gutter-like mirror and the envelopes of the small bulbs are frosted only at portions through which the internal filaments of the small bulbs face on the lower mirror.

The present invention has solved the problem of ripple and the reduction to the efficiency of illumination in a well-balanced manner by frosting the envelopes of the small bulbs only at the portions through which the internal filaments of the small bulbs face on the lower mirror. Accordingly, the exposure device of this invention can solve, with the simple structure, ripple without reducing the efficiency of light utilization to any substantial degree and can hence provide duplicate images of uniform quality.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENT

Figure 1:
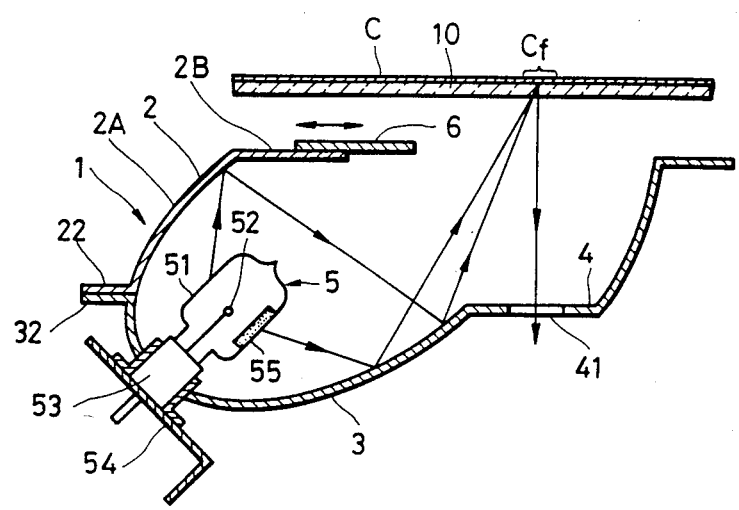
FIG. 1 is a cross-sectional view of an exposure system according to one embodiment of this invention.
Figure 2:
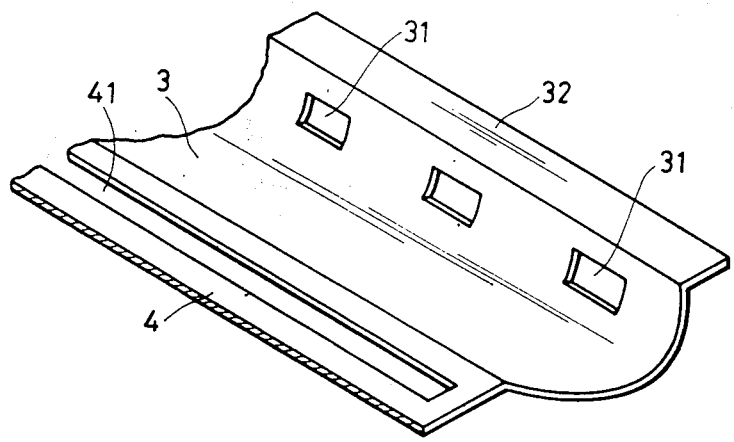
FIG. 2 is a fragmentary perspective view of a lower mirror incorporated in the exposure system of FIG. 1.

Referring first to FIG. 1, a gutter-like mirror 1 is arranged underneath a horizontal table 10 for each original document in such a way that the gutter-like mirror 1 extends along the width of the table 10. The gutter-like mirror 1 is composed of an upper mirror 2 and a lower mirror 3. The cross-sectional shape of the upper mirror 2 is formed in combination of an arcuate part 2A and a linear part 2B which extends continuously from the arcuate part 2A. On the other hand, the lower mirror 3 has a cross-sectional shape corresponding to a part of an ellipse. The lower mirror 3 terminates, at the end opposite to the upper mirror 2, in a slit plate 4 which is integral with the lower mirror 3 and defines a slit 41 extending along the length of the gutter-like mirror 1. The upper mirror 2 and lower mirror 3 are united together by means of their respective flanges 22,23. As shown in FIG. 2, at least four openings 31 are bored through an inner end portion of the lower mirror 3. The openings 31 are spacedly arranged along the length of the gutter-like mirror 1 so that when small bulbs 5 are inserted through the openings 31, they are also spacedly arranged along the length of the gutter-like mirror 1.

The small bulbs 5 are each provided in such a position that its filament 52 (see, FIG. 3) lies along the length of the gutter-like mirror 1. The number and interval of the small bulbs 5 are determined in such a manner that the distribution of illuminance along the length of a strip-like section Cf on the table 10 has a desired light distribution pattern. The strip-like section Cf is to be illuminated by the small bulbs.

Along and on the upper edge of the upper mirror 2, a light-controlling blade 6 is provided, for example, in such a way that the blade 6 can be pulled out along the table 10 in a direction approaching the section Cf. By adjusting the position of the blade 6 relative to the length of the table 10, namely, the length of the blade 6 pulled out from the upper edge of the upper mirror 2, the pattern of light distribution is controlled.

Figure 3:
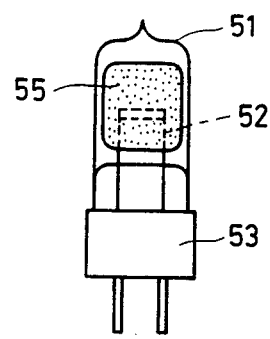
FIG. 3 is a front view of a small bulb incorporated in the exposure system of FIG. 1.

Halogen incandescent bulbs are used as the small bulbs 5. As depicted in FIG. 3, an envelope 51 of each of the bulbs 5, which envelope is made of transparent glass, is partly frosted at a part of its circumferential wall. The frosted part 55 is located in opposition to a filament 52. In the illustrated embodiments, bases 53 of the small bulbs 5 are rectangular in cross section and thus have directionality. The small bulbs 5 are inserted in their corresponding sockets 54 with the frosted parts 55 facing downward. The filaments 52 are positioned at the first focal position of the lower mirror 3. The frosted parts 55 are limited to areas through which the filaments 52 face on the lower mirror 3.

The section Cf where an original document C placed on the table 10 is illuminated has a strip-like pattern, usually, of a width of about 8 mm or so. The section Cf is located at the second focal position of the lower mirror 3. The light of the small bulbs 5, which has been irradiated onto the lower mirror 3, is reflected to illuminate the section Cf. On the other hand, the light irradiated onto the upper mirror 2 is also reflected. However, the thus-reflected light is not allowed to reach the section Cf directly but is first irradiated onto the lower mirror 3 and is then reflected to reach the section Cf. The light reflected by the original document C at the section Cf travels through the slit 41 into an unillustrated optical projection system, followed by its projection on an unillustrated photosensitive member. A latent image is thus formed on the photosensitive member. This latent image is thereafter developed by toner, thereby making it visible. The resultant toner image is then transferred on a sheet of copying paper, followed by its fixing to complete a duplicate picture or mark. By the way, it is preferable to use the light-controlling blade 6 so as to shield the light, which would otherwise travels from the small bulbs 5 directly to the section Cf.

Owing to the adoption of the above-described construction, the light which reaches the section Cf subsequent to its single reflection by the lower mirror 3 is the light emitted thorough the frosted parts 55, and the light which was emitted through the transparent parts of the envelopes 51 is allowed to reach the section Cf after it has been reflected twice, once by the upper mirror 2 and again by the lower mirror 3.

Figure 4:
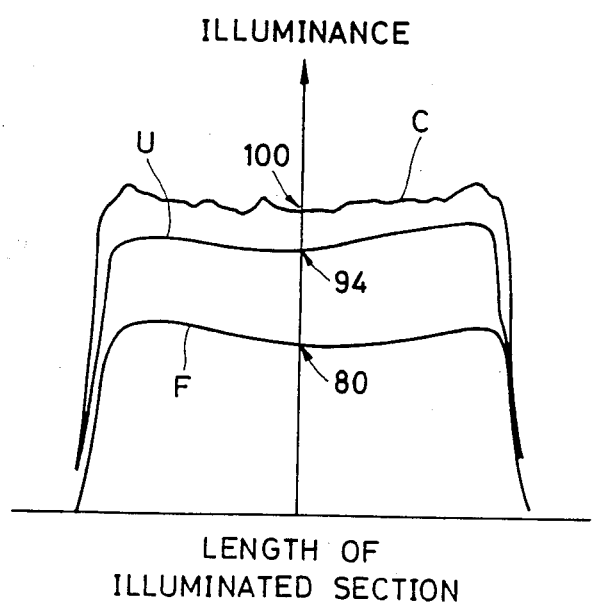
FIG. 4 illustrates characteristic curves of light distribution.

In FIG. 4, Curve U is a curve of illuminance obtained on the photosensitive member in accordance with the present embodiment. Curve C indicates an illuminance curve obtained by using lamps with non-frosted transparent envelopes in place of the small bulbs 5. On the other hand, Curve F is an illuminance curve obtained by using lamps with entirely-frosted envelopes instead of the small bulbs 5. Curves C and F are shown for the sake of comparison. As apparent from FIG. 4, Curve C has the higher illuminance but many ripples are observed. On the other hand, Curve F is free of ripples but its illuminance is significantly lower. When the illuminance is supposed to be 100 at the center of Curve C, the central illuminance of Curve F is 80, indicating an extremely lower illumination efficiency. On the other hand, Curve U indicates that ripples have been solved to an extent similar to Curve F and the illuminance is 94 at the center thereof. It has thus been found that this illuminance is slightly lower than the central illuminance of Curve C but significantly higher compared with the central illuminance of Curve F.

The following explanation may be made as reasons for the elimination of ripples on Curve U. Namely, a mirror has a certain degree of diffusing function. As a result of reflection of the light twice, once by the upper mirror and again by the lower mirror, a substantial diffusing effect appears to have been brought about. In the present invention, the light which is to be reflected only once by the mirror is converted to broad light through the frosted parts 55, and the light emitted through the parts other than the frosted parts is reflected twice by the mirror and is also converted to broad light. The higher illuminance of Curve U than that of Curve F can be attributed clearly to the fact that the small bulbs 5 are frosted only partly.

Having now fully described the invention, it will be apparent to one of ordinary skill in the art that many changes and modifications can be made thereto without departing from the spirit or scope of the invention as set forth herein.

What is claimed is:

1. In an exposure device suitable for use in a copying machine, said exposure system including a gutter-like mirror composed of an upper mirror and a lower mirror so that light projected from a light source onto the lower mirror is reflected to illuminate the surface of an original document in the pattern of a strip but light projected from the light source onto the upper mirror is reflected first onto the lower mirror and then reflected again by the lower mirror to illuminate the surface of the original document in the pattern of the strip, the improvement wherein at least four small bulbs are arranged as the light source along the length of the gutter-like mirror and the envelopes of the small bulbs are frosted only at portions through which the internal filaments of the small bulbs face on the lower mirror.

2. An exposure device as claimed in claim 1, wherein the small bulbs are halogen incandescent lamps whose filaments extend along the length of the gutter-like mirror.

3. An exposure device as claimed in claim 1, wherein the small bulbs are respectively held in place by means of sockets in openings formed through the lower mirror.

4. An exposure device as claimed in claim 1, wherein a light-controlling blade is provided, along the upper edge of the upper mirror, movably in a direction substantially perpendicular to the length of the gutter-like mirror.

* * * * *